(12) United States Patent
Hamblet (10) Patent No.: US 10,659,954 B2
(45) Date of Patent: May 19, 2020

(54) ESIM SUBSCRIPTION MANAGEMENT SYSTEM

(71) Applicant: Teal Communications, Inc., Bellevue, WA (US)

(72) Inventor: Robert Martin Hamblet, Sammamish, WA (US)

(73) Assignee: TEAL COMMUNICATIONS, INC., Bellevue, WA (US)

( * ) Notice: Subject to any disclaimer, the term of this patent is extended or adjusted under 35 U.S.C. 154(b) by 0 days.

(21) Appl. No.: 15/975,443

(22) Filed: May 9, 2018

(65) Prior Publication Data

US 2019/0349743 A1    Nov. 14, 2019

(51) Int. Cl.
| | |
|---|---|
| *H04B 1/38* | (2015.01) |
| *H04W 8/12* | (2009.01) |
| *H04M 15/00* | (2006.01) |
| *H04W 8/04* | (2009.01) |
| *H04W 8/06* | (2009.01) |
| *H04W 8/18* | (2009.01) |
| *H04W 4/50* | (2018.01) |
| *H04W 8/20* | (2009.01) |
| *H04W 8/24* | (2009.01) |

(52) U.S. Cl.
CPC .......... *H04W 8/12* (2013.01); *H04M 15/715* (2013.01); *H04W 8/04* (2013.01); *H04W 8/06* (2013.01); *H04W 8/183* (2013.01); *H04W 4/50* (2018.02); *H04W 8/205* (2013.01); *H04W 8/245* (2013.01)

(58) Field of Classification Search
CPC .......... H04W 8/12; H04W 8/04; H04W 8/06; H04W 8/83; H04W 8/245; H04W 8/205; H04M 15/715
See application file for complete search history.

(56) References Cited

U.S. PATENT DOCUMENTS

| | | | |
|---|---|---|---|
| 2013/0217361 A1* | 8/2013 | Mohammed .......... | H04W 12/06 455/411 |
| 2014/0031012 A1* | 1/2014 | Park ...................... | H04W 12/06 455/411 |
| 2014/0349617 A1 | 11/2014 | Li et al. | |

(Continued)

FOREIGN PATENT DOCUMENTS

WO     2013/169484     11/2013

*Primary Examiner* — Barry W Taylor
(74) *Attorney, Agent, or Firm* — Davis Wright Tremaine LLP; George C. Rondeau, Jr.; Heather M. Colburn (57) ABSTRACT

A system for use with a mobile cellular device comprising an Internet browser and an embedded subscriber identity module ("eSIM") card. The eSIM card stores an application and a first profile. The system includes a web server configured to generate a web portal comprising a plurality of service plans. The first profile establishes communication over a first network with the web server, which transmits the web portal to the Internet browser over the first network. The web portal receives a selection of one of the service plans from the Internet browser. The web server sends the selection to a subscription manager configured to select an operational profile based on the selection and cause the operational profile to be transmitted to the application. The mobile cellular device is configured to communicate over a second network using the operational profile after the operational profile has been received and activated by the application.

23 Claims, 5 Drawing Sheets

(56) References Cited

U.S. PATENT DOCUMENTS

| | | | | |
|---|---|---|---|---|
| 2018/0376325 A1* | 12/2018 | Xu | ................. | H04W 8/245 |
| 2019/0037335 A1* | 1/2019 | Steck | ................. | H04W 8/245 |
| 2019/0058989 A1* | 2/2019 | Park | ................. | H04W 8/20 |
| 2019/0104401 A1* | 4/2019 | Park | ................. | H04L 29/08 |

\* cited by examiner

ESIM SUBSCRIPTION MANAGEMENT SYSTEM

BACKGROUND OF THE INVENTION

Field of the Invention

The present invention is directed generally to systems and methods for provisioning cellular services to mobile devices and, more particularly, to systems and methods for providing cellular services to mobile devices that include embedded subscriber identity module ("eSIM") cards.

Description of the Related Art

Before a user can start using cellular services provided by a mobile network operator on a cellular data network, the user typically has to call or visit the mobile network operator and perform a number of steps to provision those services. Additionally, the mobile network operator has to configure the user's cellular enabled device to operate on the cellular data network. Therefore, a need exists for methods and systems that avoid the need to perform at least some of these steps. The present application provides this and other advantages as will be apparent from the following detailed description and accompanying figures.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
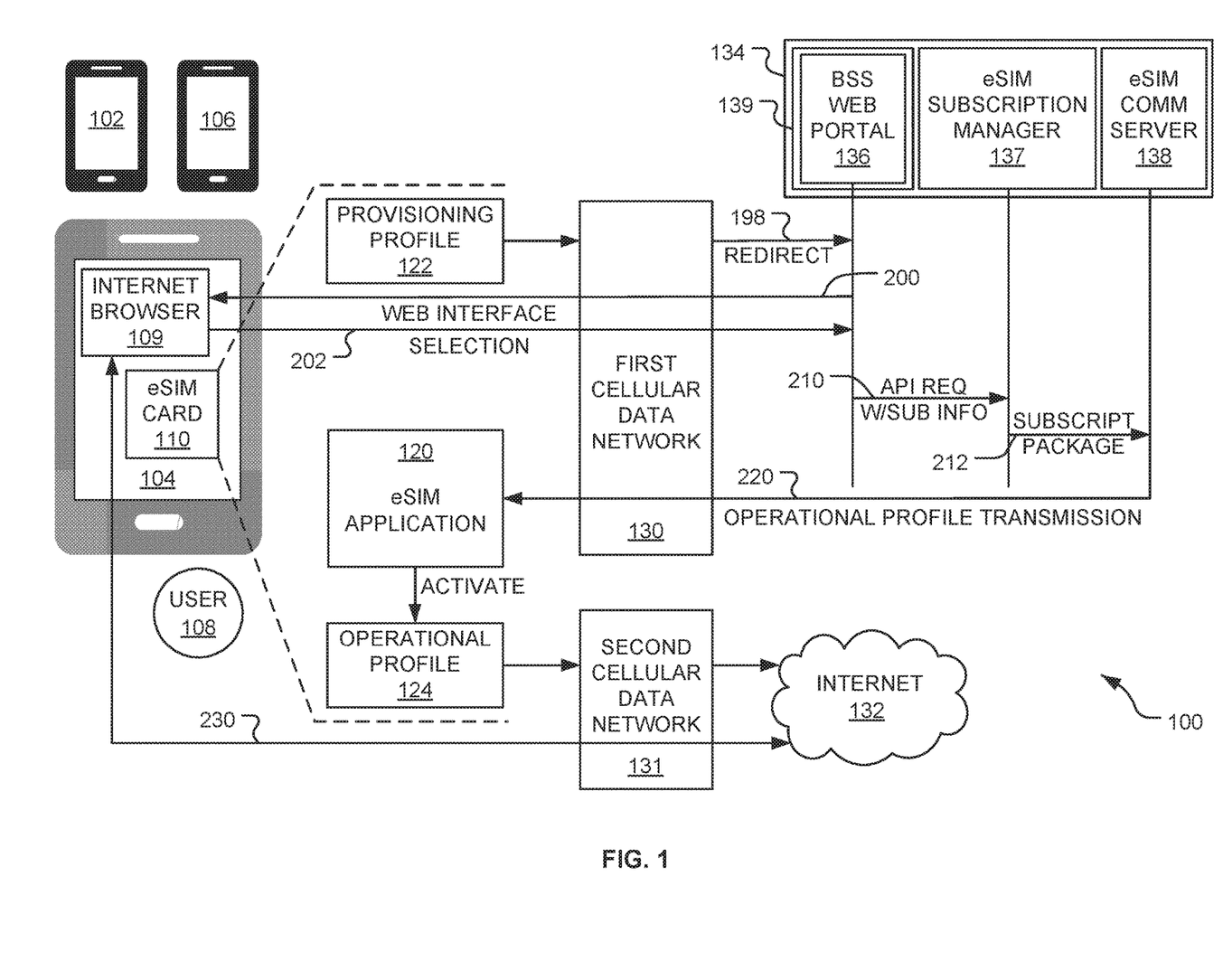
FIG. 1 is a functional block diagram of a subscription management system configured to provide cellular services to a plurality of cellular enabled devices that each include an embedded subscriber identity module ("eSIM") card.

FIG. 1 is a functional block diagram of a subscription management system 100 configured to provide cellular services to cellular enabled devices 102-106 that each include an embedded subscriber identity module ("eSIM") card 110. By way of a non-limiting example, at least some of the cellular enabled devices 102-106 may each be implemented as a mobile communication device 300 illustrated in FIG. 6. By way of another non-limiting example, at least some of the cellular enabled devices 102-106 may each be implemented as devices (e.g., vehicles) configured for machine-to-machine ("M2M") communication and/or to communicate on the Internet of Things ("IoT"). For ease of illustration, FIG. 1 includes only the three cellular enabled devices 102-106. However, the system 100 may include any number of devices each like the device 104. Each of the cellular enabled devices 102-106 is operated by a different end user. For ease of illustration, the device 104 has been illustrated as being operated by an end user 108. The device 104 is configured to execute an Internet browser 109 or similar communication application.

By way of non-limiting examples, the eSIM card 110 may be implemented as an embedded chip (e.g., soldered on a board), a plastic card (e.g., inserted into the device 104), and the like. The eSIM card 110 is configured to be updated wirelessly with one or more different operator profiles. In contrast, traditional SIM cards store only a single operator profile that cannot be changed. Additionally, traditional SIM cards are designed to be removable (e.g., by the end user 108). In contrast, the device 104 and/or the eSIM card 110 may be configured to prevent the removal of the eSIM card 110 from the device 104 by the end user 108.

The eSIM card 110 includes an eSIM application 120, a provisioning profile 122, and an operational profile 124. The provisioning profile 122 includes one or more applications configured to access a first cellular data network 130 and any network credentials required by the first cellular data network 130 to use the first cellular data network 130, such as a provisioning International Mobile Subscriber Identity ("IMSI"). The provisioning profile 122 may be characterized as being a default profile that is usable by the eSIM card 110 to communicate over the first cellular data network 130. The operational profile 124 includes one or more applications configured to access a second cellular data network 131 and any network credentials required by the second cellular data network 131 to use the second cellular data network 131, such as an operational IMSI. The first and second cellular data networks 130 and 131 may be the same network or different networks. The first and second cellular data networks 130 and 131 may operate in the same country or in different countries. The second cellular data network 131 is connected to the Internet 132.

The first cellular data network 130 is connected to one or more entities 134 that operate a Business Support System ("BSS") self-service or web portal 136, an eSIM subscription manager 137, and an eSIM communication server 138. The BSS web portal 136, the eSIM subscription manager 137, and the eSIM communication server 138 may each be implemented by one or more computing devices (e.g., each like a computing device 12 illustrated in FIG. 5). By way of a non-limiting example, the BSS web portal 136, the eSIM subscription manager 137, and the eSIM communication server 138 may each be implemented as a different computing device. In the embodiment illustrated, the BSS web portal 136 has been implemented by a web server 139.

As mentioned above, the device 104 may communicate over the first cellular data network 130 using the provisioning profile 122 on the eSIM card 110. However, this communication is limited. The eSIM card 110 may use the provisioning profile 122 to communicate with only the BSS web portal 136 over the first cellular data network 130.

As will be described below, the eSIM card 110 receives the operational profile 124 from the eSIM communication server 138. Thus, before the eSIM card 110 receives the operational profile 124, the eSIM card 110 is configured to communicate with only the BSS web portal 136 over the first cellular data network 130 using the provisioning profile 122.

On the other hand, after the eSIM card 110 receives the operational profile 124, the eSIM application 120 activates the operational profile 124 (e.g., marks the operational profile 124 as active within the eSIM card 110), which configures the eSIM card 110 to use the operational profile 124 to communicate over the second cellular data network 131 in accordance with a subscription type or service plan selected by the end user 108.

Figure 3:
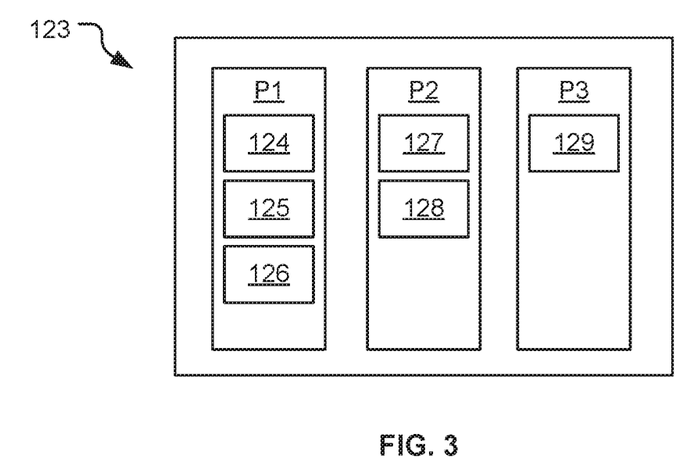
FIG. 3 is a block diagram illustrating an inventory of pre-activated cellular service plans each associated with one or more operational profiles that is stored or accessible by an eSIM subscription manager.

Referring to FIG. 3, the eSIM subscription manager 137 (see FIG. 1) stores or has access to an inventory 123 of pre-activated cellular service plans P1-P3 each associated with one or more operational profiles 124-129 (e.g., each like the operational profile 124). For ease of illustration, the inventory 123 illustrated in FIG. 3 includes only the three cellular service plans P1-P3 and the six operational profiles 124-129. However, the inventory 123 may include any number of service plans and any number of operational profiles. In the example illustrated, the operational profiles 124-126 are each associated with the service plan P1, the operational profiles 127 and 128 are each associated with the service plan P2, and the operational profile 129 is associated with the service plan P3.

After the end user 108 selects one of the service plans P1-P3 (e.g., the service plan P1), the eSIM subscription manager 137 selects one of the operational profiles 124-129 (e.g., the operational profile 124) associated with the selected service plan. Then, the eSIM subscription manager 137 instructs the eSIM communication server 138 to transmit the selected operational profile 124 to the eSIM application 120 over the first cellular data network 130. By way of a non-limiting example, the eSIM subscription manager 137 may be implemented using software sold by IDEMIA (e.g., M-Connect Subscription Manager software).

Referring to FIG. 1, the eSIM communication server 138 is configured to transmit the operational profile 124 to the eSIM application 120 over the first cellular data network 130. By way of non-limiting examples, the eSIM communication server 138 may be implemented as a short message service center ("SMSC") configured to communicate with the eSIM application 120 via Short Message Service ("SMS") messages, a Hypertext Transfer Protocol ("HTTP") server configured to communicate with the eSIM application 120 via HTTP messages, and the like. Thus, the operational profile 124 may be transmitted to the eSIM application 120 via an SMS message, HTTP message, and the like.

Figure 2:
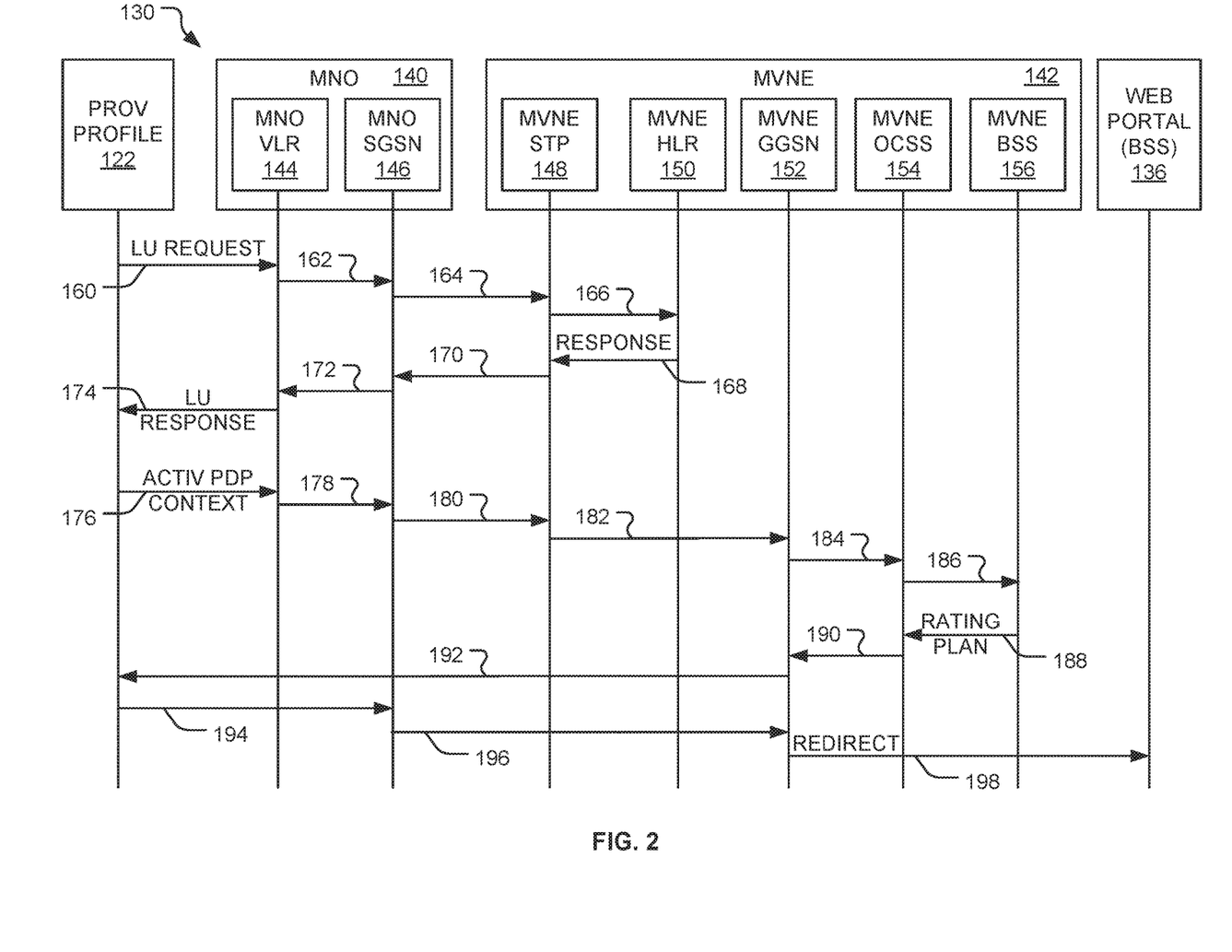
FIG. 2 is a diagram illustrating a provisioning profile of one of the plurality of cellular enabled devices attaching to a first cellular data network and connecting to a BSS web portal over the first cellular data network.

Referring to FIG. 2, the first cellular data network 130 is operated by a mobile network operator ("MNO") 140 and a mobile virtual network enabler ("MVNE") 142. In the embodiment illustrated, the MNO 140 is implemented as a mobile virtual network operator ("MVNO"). The MNO 140 is the provider of wireless communications services but does not necessarily own or control all of the elements, such as radio spectrum and wireless network infrastructure, required to deliver these services to the end user 108 (see FIG. 1). The MVNE 142 may provide at least some of these elements to the MNO 140, which enable the MNO 140 to offer cellular services to the end user 108 (see FIG. 1).

In the embodiment illustrated, the MNO 140 includes a visitor location register ("VLR") 144 and a Serving GPRS Support Node ("SGSN") 146. As used herein, "GPRS" is an initialism for General Packet Radio Service. The MVNE 142 may include a Signal Transfer Point ("STP") 148, a home location register ("HLR") 150, a Gateway GPRS Support Node ("GGSN") 152, an Online Charging System server ("OCSS") 154, and a MVNE BSS 156. The STP 148 may be implemented as a router or routing device. The STP 148 functions as a switch that forwards messages and may be used anywhere in the first cellular data network 130 (e.g., to consolidate or sort traffic). For ease of illustration, the MVNE 142 has been illustrated as including only the single STP 148. However, the MVNE 142 may include any number of STPs, each like the STP 148, that are positioned in different locations and used to forward communications. The OCSS 154 allows a communications service provider to charge their customers, in real time, based on service usage. The MVNE BSS 156 supports various telecommunication services. At least one of the GGSN 152, the OCSS 154, and the MVNE BSS 156 is configured to provide a rating plan or group policy that instructs the GGSN 152 to direct the provisioning profile 122 to the BSS web portal 136.

In alternate embodiments, one or more of the STP 148, the HLR 150, the GGSN 152, the OCSS 154, and the MVNE BSS 156 may be operated by the one or more entities 134. As mentioned above, in the embodiment illustrated, the BSS web portal 136 is operated by the one or more entities 134. However, in alternate embodiments, the BSS web portal 136 may be operated by the MVNE 142.

Figure 5:
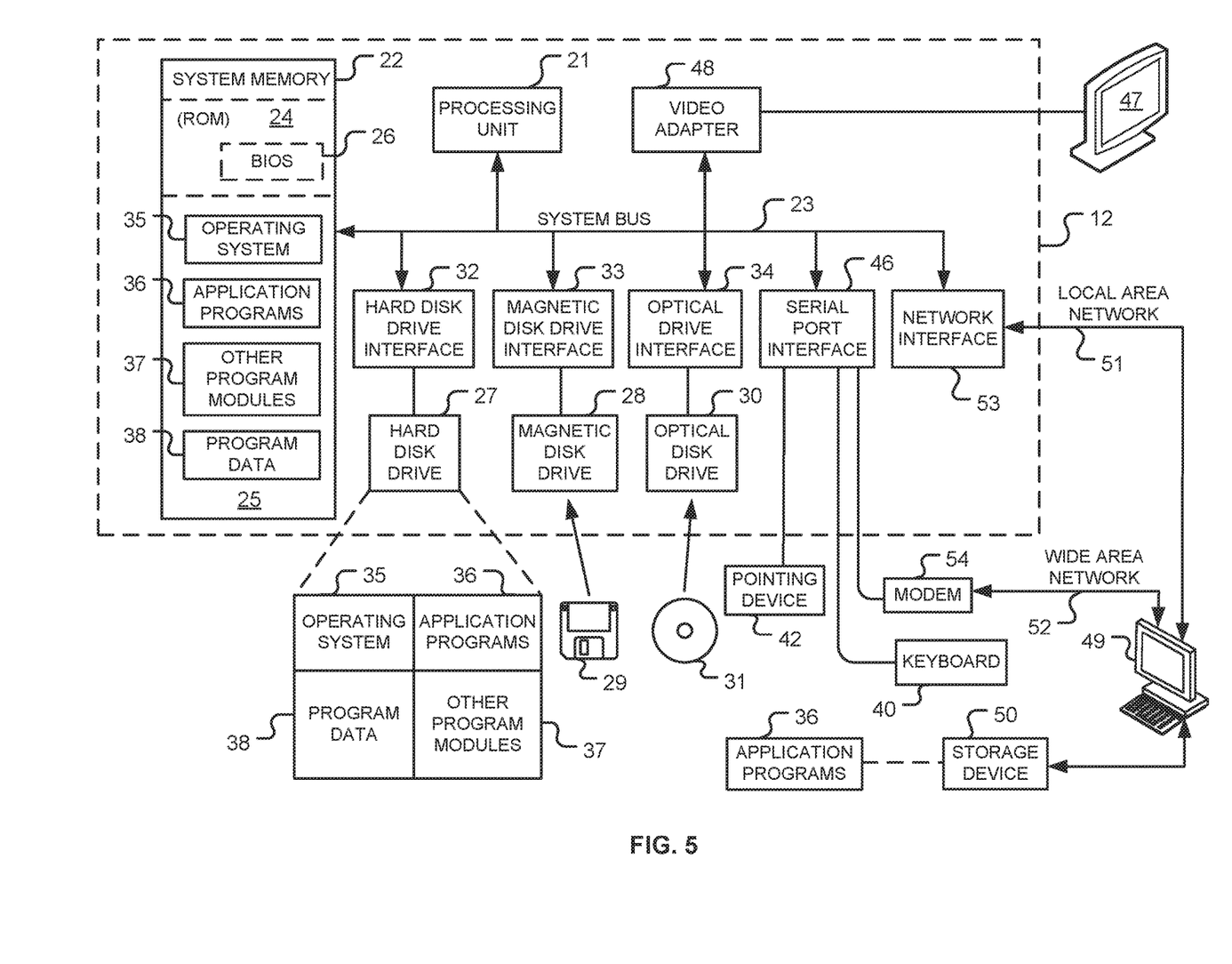
FIG. 5 is a diagram of a hardware environment and an operating environment in which the computing devices of the system of FIGS. 1 and 2 may be implemented.

The VLR 144, the SGSN 146, the STP 148, the HLR 150, the GGSN 152, the OCSS 154, and the MVNE BSS 156 may each be implemented by one or more computing devices (e.g., each like the computing device 12 illustrated in FIG. 5). By way of a non-limiting example, the VLR 144, the SGSN 146, the STP 148, the HLR 150, the GGSN 152, the OCSS 154, and the MVNE BSS 156 may each be implemented on a different computing device.

Mobile network operators ("MNOs") sell or provide cellular service plans to end users (e.g., the end user 108). The cellular service plans specify those cellular services available under the service plan and may specify costs associated with those services. Multiple different service plans are available to the end user 108. The different service plans may be offered by one or more different MNOs. To operate the device 104 (e.g., to connect to the Internet 132), the end user 108 must select and pay for a particular service plan offered by a particular MNO. As mentioned above, within the system 100, the eSIM subscription manager 137 stores or has access to the inventory 123 (see FIG. 3) of cellular service plans P1-P3 (see FIGS. 3 and 4). For example, referring to FIG. 3, the MNO of the second cellular data network 131 (see FIG. 1) may offer the service plan P1. The service plans P2 and P3 may each be offered by the same MNO or different MNOs.

After the end user selects a particular service plan offered by a particular MNO, the particular MNO must configure the traditional SIM card or eSIM card within a particular cellular enabled device to operate on the particular MNO's cellular data network. Both traditional SIM cards and eSIM cards store an operator profile. The operator profile is configured by the particular MNO and includes information (e.g., an IMSI) that is used by the particular MNO to identify and authenticate the traditional SIM card or the eSIM card on the MNO's cellular data network. Thus, when the end user selects a particular service plan offered by a particular MNO, the particular MNO may supply a new SIM card or configure the existing SIM card to operate on the particular MNO's cellular data network. By way of a non-limiting example, the particular MNO may encode a new IMSI on the SIM card or eSIM card.

Traditionally, configuring a SIM card or an eSIM card to operate on the particular MNO's cellular data network required the end user to call or visit the particular MNO and work with an employee to activate the particular cellular service plan and configure the device. The system 100 avoids these steps by allowing the end user 108 to select and pay for one the service plans P1-P3 (see FIGS. 3 and 4) from a web interface 200 (see FIG. 4) and download the operational profile 124 directly to the eSIM card 110. In other words, from the perspective of the end user 108, the end user 108 simply downloads the operational profile 124 in a manner similar to downloading an application from an application store. Thus, the end user 108 avoids the need to call or visit the MNO of the second cellular data network 131 and work with the employee of that MNO. Additionally, the MNO of the second cellular data network 131 avoids the need to configure the eSIM card 110.

A traditional MVNO delivers cellular services on only one cellular data network operating in a single country. Few MVNOs can deliver cellular services on multiple cellular data networks (e.g., operating in multiple different countries). Those MVNOs that can deliver such services do so by using multiple traditional SIM cards or other legacy technology. The system 100 avoids the need to use multiple SIM cards because the pre-activated service plans P1-P3 (see FIGS. 3 and 4) may be configured to operate on multiple different cellular data networks (e.g., operating in multiple different countries). Also, when the end user 108 travels to a different country, the end user 108 may simply use the eSIM card 110 and the Internet browser 109 to access the BSS Web Portal 136, select a new service plan, and download a new operational profile configured to operate on a cellular data network operating within that country.

Referring to FIG. 1, before the eSIM card 110 has downloaded the operational profile 124, the provisioning profile 122 instructs the eSIM card 110 to search for the first cellular data network 130 when the device 104 is powered on. On the other hand, after the eSIM card 110 has downloaded the operational profile 124, the operational profile 124 instructs the eSIM card 110 to search for the second cellular data network 131 when the device 104 is powered on. Thus, the device 104 may use the eSIM card 110 to access the BSS web portal 136 over either the first cellular data network 130 using the provisioning profile 122, or the second cellular data network 131 using the operational profile 124.

When the end user 108 wishes to select one of the pre-activated service plans P1-P3 (see FIGS. 3 and 4), the end user 108 uses the Internet browser 109 to access the BSS web portal 136. For example, the user 108 may use the Internet browser 109 to visit the BSS web portal 136 over the second cellular data network 131, in which case the eSIM card 110 uses the operational profile 124. Alternatively, before the eSIM card 110 has downloaded the operational profile 124, the provisioning profile 122 may be redirected to the BSS web portal 136 by the GGSN 152 (see FIG. 2). This redirection may occur when the end user 108 launches the Internet browser 109 and attempts to visit a web site (e.g., other than the BSS web portal 136). Alternatively, the redirection may occur automatically after the device 104 is powered on, in which case an operating system executing on the device 104 may automatically launch the Internet browser 109 after the provisioning profile 122 has connected to the first cellular data network 130.

FIG. 2 provides an illustrative example of communication that may occur between the provisioning profile 122 and the BSS web portal 136 before the eSIM card 110 has downloaded the operational profile 124. As mentioned above, the provisioning profile 122 (see FIG. 1) includes information that is used by the MNO 140 to identify and authenticate the eSIM card 110 (see FIG. 1) on the first cellular data network 130. In this example, the first cellular data network 130 is a Global System for Mobile ("GSM") communications network. Thus, the information included in the provisioning profile 122 (see FIG. 1) may include a provisioning IMSI.

After the device 104 (see FIG. 1) locates the first cellular data network 130, the provisioning profile 122 attaches to the first cellular data network 130 and activates a packet data protocol ("PDP") context.

By way of a non-limiting example, the provisioning profile 122 may attach to the first cellular data network 130 by performing the following IMSI attach procedure. The provisioning profile 122 sends a location update request 160 to the VLR 144. The location update request 160 includes the provisioning IMSI. The VLR 144 sends a communication 162 with the location update request to the SGSN 146. The SGSN 146 sends a communication 164 with the location update request to the STP 148. The STP 148 sends a communication 166 with the location update request to the HLR 150. The HLR 150 sends a response 168 to the STP 148. Before sending the response, the HLR 150 may look up the device 104 using the provisioning IMSI to confirm that the device 104 is allowed on the first cellular data network 130. The STP 148 sends a communication 170 with the response to the SGSN 146. The SGSN 146 sends a communication 172 with the response to the VLR 144. The VLR 144 sends a communication 174 with the response to the provisioning profile 122. The communication 174 confirms that the device 104 (see FIG. 1) is allowed on the first cellular data network 130 and informs the provisioning profile 122 that the location of the device 104 has been updated.

The PDP context is a connection between the device 104 and an end address (e.g., on the Internet 132) that travels through the SGSN 146 and GGSN 152. Activating the PDP context allocates a first PDP context data structure on the SGSN 146 and a second PDP context data structure on the GGSN 152. By way of a non-limiting example, the first and second PDP context data structures may each store an IP address associated with the device 104, the provisioning IMSI, a Tunnel Endpoint ID ("TEID") at the GGSN, and a TEID at the SGSN.

By way of a non-limiting example, the provisioning profile 122 may activate the PDP context as follows. The provisioning profile 122 sends a request 176 to activate the PDP context to the VLR 144. The VLR 144 sends a communication 178 with the activate PDP context request to the SGSN 146. The SGSN 146 creates the first PDP context data structure. The SGSN 146 sends a create PDP context request 180 to the STP 148. The STP 148 sends a communication 182 with the create PDP context request to the GGSN 152. The GGSN 152 sends a request 184 for an OCS rating plan to the OCSS 154. The OCSS 154 sends a request 186 for a BSS rating plan to the MVNE BSS 156. The MVNE BSS 156 sends the BSS rating plan 188 to the OCSS 154 in response to the request for the BSS rating plan. Then, the OCSS 154 sends the OCS rating plan 190 to the GGSN 152 in response to the request for the OCS rating plan. Optionally, the OCSS 154 may also send at least a portion of the BSS rating plan 188 to the GGSN 152.

As mentioned above, at least one of the GGSN 152, the OCSS 154, and the MVNE BSS 156 provides the rating group policy that instructs the GGSN 152 to direct the provisioning profile 122 to the BSS web portal 136. By way of non-limiting examples, the rating group policy may be the BSS rating plan, the OCS rating plan, or a combination thereof. The rating group policy is determined by a Policy and Charging Rules Function ("PCRF") node (not shown) and optionally, may be set by the OCSS 154.

Then, the GGSN 152 creates the second PDP context data structure. Next, the GGSN 152 sends a request 192 to activate a PDP context to the eSIM application 120 indicating that the PDP context has been activated.

At this point, the device 104 (e.g., the Internet browser 109, the provisioning profile 122, and the like) attempts to visit the end address. The provisioning profile 122 sends a communication 194 (e.g., using GTP-C protocol) to the SGSN 146. The SGSN 146 sends a communication 196 (e.g., using GTP-C protocol and/or GTP-U protocol) to the GGSN 152. Then, the GGSN 152 sends a communication 198 to the BSS web portal 136, instead of the MVNE BSS 156. Thus, the communication 198 may be characterized as being redirected. In other words, the communication 198 is redirected in accordance with the rating group policy, which specifies the provisioning profile 122 is to be directed only to the BSS web portal 136.

Referring to FIG. 1, when the provisioning profile 122 is redirected to the BSS web portal 136, the BSS web portal 136 generates the web interface 200 and transmits it across the first cellular data network 130 to the Internet browser 109. As mentioned above, the Internet browser 109 may have been launched previously by the end user 108 or may be launched automatically by the operating system executing on the device 104. The Internet browser 109 displays the web interface 200 to the end user 108. The web interface 200 may be implemented as a Self-Service web portal of the type normally used to make changes to a user account or collect payments from the end user 108. The web interface 200 may be customized to include branding associated with the one or more entities 134.

Figure 4:
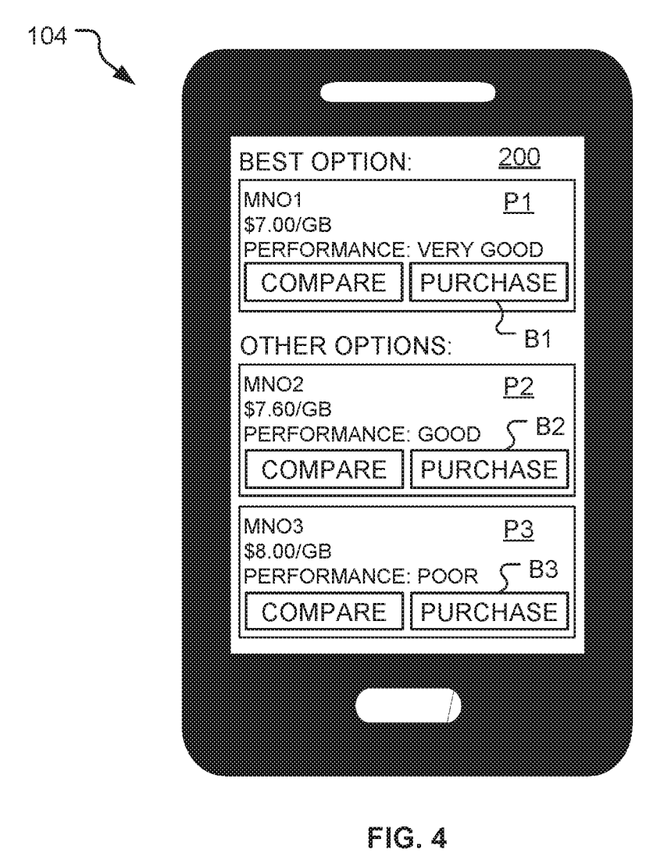
FIG. 4 is an exemplary web interface generated by the BSS web portal and displayed to an end user by the cellular enabled device.

Referring to FIG. 4, the web interface 200 includes information about the service plans P1-P3 that are available to the end user 108 (see FIG. 1). As mentioned above, the service plans P1-P3 may be offered by one or more different MNOs. For example, the MNO of the service plan P1 is "MNO1," the MNO of the service plan P2 is "MNO2," and the MNO of the service plan P3 is "MNO3." Thus, in this example, the MNO operating the second cellular data network 131 (see FIG. 1) is "MNO1" if the end user 108 (see FIG. 1) selects the service plan P1.

Referring to FIG. 1, the BSS web portal 136 may be characterized as implementing a dynamic marketplace that allows the end user 108 or machine operators on the IoT to select from the available service plans (e.g., in a plurality of countries) using the web interface 200. For example, the service plans P1-P3 (see FIGS. 3 and 4) may include generic Internet access on a specific network, special Internet access using a service plan tailored to a branded service partner, and the like. The web interface 200 may display available network rates side-by-side for different MNOs. Referring to FIG. 4, optionally, the web interface 200 may be configured to sort and/or rank the service plans P1-P3 (e.g., by cost, performance, quality of service, etc.). In the example illustrated, the service plans P1-P3 have been ranked by cost.

The end user 108 (see FIG. 1) selects one of the service plans P1-P3 displayed on the web interface 200 to which the end user 108 wishes to subscribe. In the embodiment illustrated, the service plans P1-P3 are associated with selectable buttons B1-B3, respectively. The end user 108 (see FIG. 1) may select one of the service plans P1-P3 by selecting the button associate with the service plan. For ease of illustration, the end user 108 may select the button B1 associated with the service plan P1.

Referring to FIG. 1, after the end user 108 enters the selection, the Internet browser 109 sends a communication 202 with the selection across the first cellular data network 130 to the BSS web portal 136. After the BSS web portal 136 receives the communication 202, the BSS web portal 136 sends a request 210 to the eSIM subscription manager 137. The request 210 identifies the selection and includes subscriber information (e.g., the information included in the provisioning profile 122). By way of a non-limiting example, the request 210 may include one or more of the following:

- an identifier of the eSIM card 110, such as an integrated circuit card identifier ("ICCID"), electronic identity ("EID"), and the like;
- at least a portion of the provisioning profile 122, such as the provisioning IMSI; and/or
- a profile identifier.

The profile identifier identifies the service plan (e.g., the selected plan P1) selected by the end user 108. By way of a non-limiting example, the profile identifier may be implemented as a number or text value.

The request 210 may be sent as an application programming interface ("API") request. The API request may be configured to communicate via a protocol, such as Simple Object Access Protocol ("SOAP"). By way of a non-limiting example, the API request may transmit the request as an HTTP request containing subscriber information. However, this is not a requirement. For example, REpresentational State Transfer ("REST") or Extensible Markup Language ("XML") data formatting may be used. Thus, the BSS web portal 136 may be configured to generate the web interface 200 displayed by the device 104, receive the communication 202 with the selection made by the end user 108, and initiate the request 210 that informs the eSIM subscription manager 137 of the selection made by the end user 108.

After the eSIM subscription manager 137 receives the request 210, the eSIM subscription manager 137 selects the operational profile 124 from the available operational profiles (e.g., the operational profiles 124-126 illustrated in FIG. 3) that are associated with the service plan (e.g., the selected plan P1 illustrated in FIGS. 3 and 4) identified by the profile identifier. For example, the eSIM subscription manager 137 may select the next available operational profile for the selected service plan (e.g., the service plan P1). Then, the eSIM subscription manager 137 instructs the eSIM communication server 138 to transmit the selected operational profile 124 to the eSIM application 120 over the first cellular data network 130. Optionally, the eSIM subscription manager 137 may send information 212 about the selected service plan to the eSIM communication server 138. Optionally, the eSIM subscription manager 137 may send the selected operational profile 124 to the eSIM communication server 138. The eSIM communication server 138 sends a transmission 220 that includes the selected operational profile 124 to the eSIM application 120. Depending on the implementation details, the operational profile 124 may include a new operational IMSI.

After the eSIM application 120 receives the transmission 220, the eSIM application 120 configures the eSIM card 110 to operate with the operational profile 124 instead of the provisioning profile 122. For example, the eSIM application 120 may store and automatically activate the operational profile 124. In this manner, the device 104 is configured to communicate over the second cellular data network 131 immediately after the operational profile 124 has been activated by the eSIM application 120. Then, the device 104 searches for the second cellular data network 131. After locating the second cellular data network 131, the operational profile 124 attaches to the second cellular data network 131 in a manner substantially identical to the manner in which the provisioning profile 122 attached to the first cellular data network 130 illustrated in FIG. 2. Then, the operational profile 124 activates a new PDP context in a manner substantially identical to the manner in which the provisioning profile 122 activated the PDP context within the first cellular data network 130 illustrated in FIG. 2. However, the end address may an address on the Internet 132 other than the address of the BSS web portal 136. In other words, at this point, the device 104 is able to communicate in accordance with the selected service plan without any further provisioning or other operations. In the example illustrated, the device 104 is able to communicate over the second cellular data network 131 using the operational profile 124. For example, the device 104 may use the operational profile 124 to communicate with the Internet 132 over the second cellular data network 131. In FIG. 1, exemplary communication between the Internet browser 109 and the Internet 132 has been illustrated by a line 230.

As mentioned above, at any time, the end user 108 may use the Internet browser 109 to navigate to the BSS web portal 136 over the second cellular data network 131 and the Internet 132. Then, the end user 108 may use the web interface 200 to select a new service plan, which causes the web server 139 to send a request (like the request 210) to the eSIM subscription manager 137. Next, the eSIM subscription manager 137 selects a new operational profile and instructs the eSIM communication server 138 to download the new operational profile to the eSIM application 120. The eSIM application 120 receives the new operational profile from the eSIM communication server 138 and activates the new operational profile. Thus, the end user 108 enjoys the flexibility of being able to change the MNO and/or service plan at any time through the BSS web portal 136.

Computing Device

FIG. 5 is a block diagram of hardware and an operating environment in conjunction with which implementations of the web server 139 (see FIG. 1), the eSIM subscription manager 137 (see FIG. 1), and the eSIM communication server 138 (see FIG. 1) of the system 100 (see FIG. 1) and the VLR 144 (see FIG. 2), the SGSN 146 (see FIG. 2), the STP 148 (see FIG. 2), the HLR 150 (see FIG. 2), the GGSN 152 (see FIG. 2), the OCSS 154 (see FIG. 2), and the MVNE BSS 156 (see FIG. 2) of the first cellular data network 130 may be practiced. The description of FIG. 5 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including the mobile communication device 300 (see FIG. 6), hand-held devices, multiprocessor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network (e.g., the Internet 132). In a distributed computing environment, program modules may be located in both local and remote memory storage devices.

The exemplary hardware and operating environment of FIG. 5 includes a general-purpose computing device in the form of the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, a blade computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feedback game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 5 include a local-area network (LAN) 51 and a wide-area network (WAN) 52. Such networking environments are commonplace in offices, enterprise-wide computer networks, intranets and the Internet.

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the LAN 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions (e.g., for generating the web interface 200 illustrated in FIG. 4) that when executed by one or more processors cause the one or more processors to perform all or portions of the methods described above. The system memory 22 may also store data, such as the inventory 123 (see FIG. 3). Such instructions and/or data may be stored on one or more non-transitory computer-readable or processor readable media.

Mobile Communication Device

Figure 6:
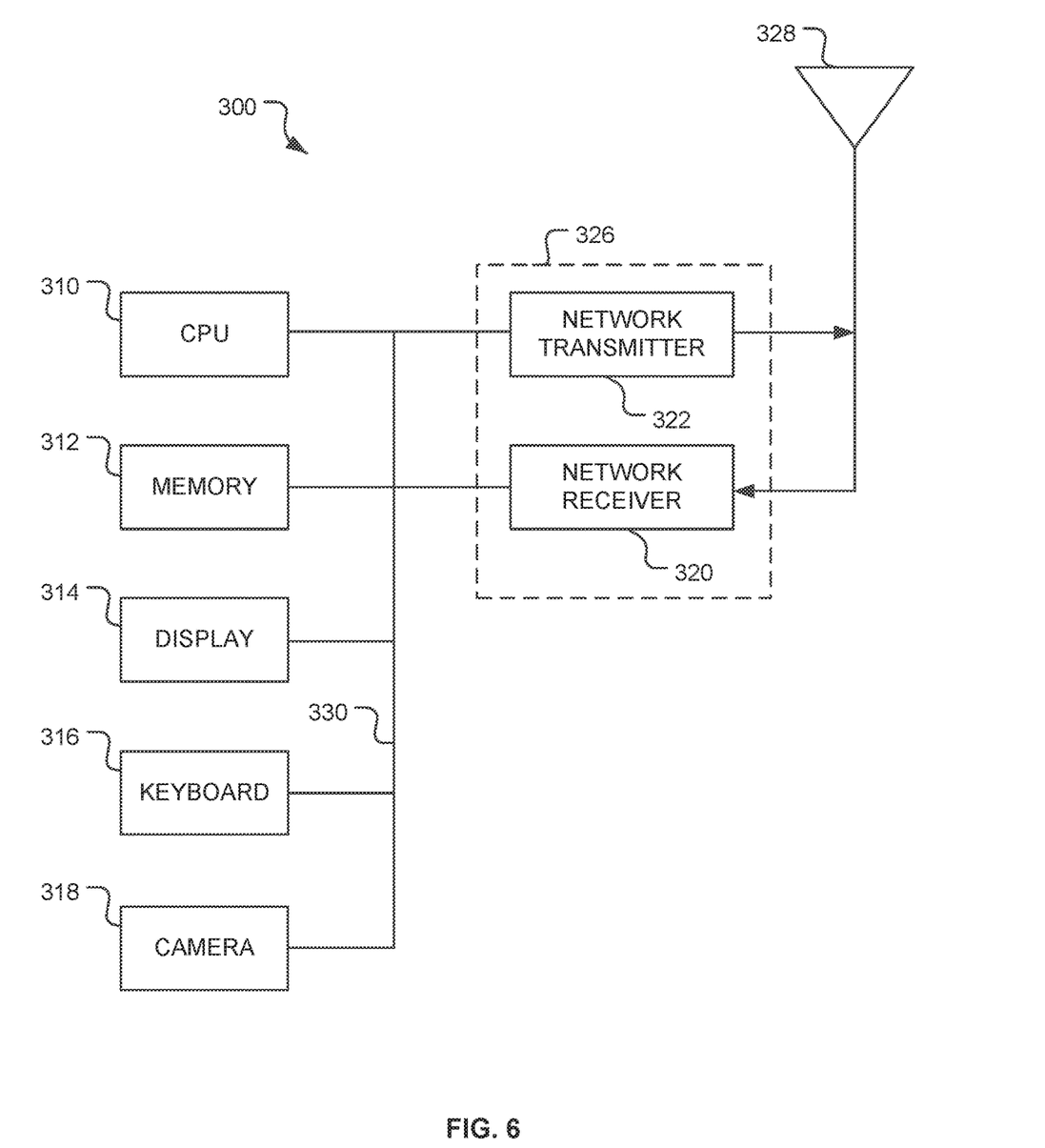
FIG. 6 is a functional block diagram illustrating an exemplary mobile communication device that may be used to implement each of the plurality of cellular enabled devices of FIG. 1.

FIG. 6 is a functional block diagram illustrating the mobile communication device 300 that may be used to implement one or more of the cellular enabled devices 102-106 (see FIG. 1) of the system 100 (see FIG. 1). The mobile communication device 300 may be implemented as a cellular telephone, smart phone, a tablet computing device, and the like. By way of a non-limiting example, the mobile communication device 300 may be implemented as a smartphone executing 105 or Android OS. By way of additional non-limiting examples, the mobile communication device 300 may be implemented as a device (e.g., a vehicle) configured for M2M communication and/or to communicate on the IoT.

The mobile communication device 300 includes a central processing unit ("CPU") 310. Those skilled in the art will appreciate that the CPU 310 may be implemented as a conventional microprocessor, application specific integrated circuit ("ASIC"), digital signal processor ("DSP"), programmable gate array ("PGA"), or the like. The mobile communication device 300 is not limited by the specific form of the CPU 310.

The mobile communication device 300 also contains the memory 312. The memory 312 may store instructions and data to control operation of the CPU 310. The memory 312 may include random access memory, ready-only memory, programmable memory, flash memory, and the like. The mobile communication device 300 is not limited by any specific form of hardware used to implement the memory 312. The memory 312 may also be integrally formed in whole or in part with the CPU 310.

The mobile communication device 300 also includes an eSIM card (not shown) like the eSIM card 110 (see FIG. 1). The mobile communication device 300 also includes conventional components, such as a display 314, a keypad or keyboard 316, and a camera or video capture device 318. For example, the display 314 may be implemented as conventional touch screen display. These are conventional components that operate in a known manner and need not be described in greater detail. Other conventional components found in wireless communication devices, such as USB interface, Bluetooth interface, infrared device, and the like, may also be included in the mobile communication device 300. For the sake of clarity, these conventional elements are not illustrated in the functional block diagram of FIG. 6.

The display 314, the keyboard 316, and the camera or video capture device 318 are operable to receive user input and selections. Together the input and display devices may be described as providing a user interface. The user interface is configured to display the web interface 200 (see FIG. 4) described above and receive input (e.g., the selection of one of the service plans P1-P3 illustrated in FIG. 4) entered into or in response to the web interface 200.

The mobile communication device 300 also includes a network transmitter 322 such as may be used by the mobile communication device 300 for normal network wireless communication with a base station (not shown). FIG. 6 also illustrates a network receiver 320 that operates in conjunction with the network transmitter 322 to communicate with the base station (not shown). In a typical embodiment, the network transmitter 322 and network receiver 320 are implemented as a network transceiver 326. The network transceiver 326 is connected to an antenna 328. Operation of the network transceiver 326 and the antenna 328 for communication with a wireless network (not shown) is well-known in the art and need not be described in greater detail herein.

The mobile communication device 300 may also include a conventional geolocation module (not shown) operable to determine the current location of the mobile communication device 300.

The various components illustrated in FIG. 6 are coupled together by the bus system 330. The bus system 330 may include an address bus, data bus, power bus, control bus, and the like. For the sake of convenience, the various busses in FIG. 6 are illustrated as the bus system 330.

The memory 312 may store instructions (e.g., all or portions of the eSIM application 120 illustrated in FIGS. 1 and 2) executable by the CPU 310. When executed by the CPU 310, the instructions may cause the CPU 310 to perform all or portions of the methods described above. The memory 312 (see FIG. 6) may also store data, such as the provisioning and operational profiles 122 and 124 (see FIG. 1). Such instructions and/or data may be stored on one or more non-transitory computer or processor readable media.

Alternatively, the eSIM card may include memory (not shown) that stores the instructions and/or data. The eSIM card may also include a processor (not shown) configured to execute the instructions. Such instructions and/or data may be stored on one or more non-transitory computer or processor readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system for use with a mobile cellular device comprising an Internet browser and an embedded subscriber identity module ("eSIM") card, the eSIM card storing an application and a provisioning profile, the system comprising:
   a Gateway GPRS Support Node ("GGSN") configured to receive a communication from the provisioning profile and obtain a rating group policy for the provisioning profile, the rating group policy indicating that the provisioning profile is to be redirected to a web portal, the GGSN being configured to redirect the provisioning profile to the web portal over a first network in accordance with the rating group policy;
   a web server configured to receive a redirected communication from the GGSN, the provisioning profile being operational to establish communication over the first network with only the web server via the GGSN, the web portal being configured to generate a web interface comprising a plurality of service plans and transmit the web interface to the Internet browser over the first network, the web portal being configured to receive a selection of one of the plurality of service plans from the Internet browser;
   a subscription manager configured to select an operational profile based on the selection, the web server being configured to send the selection to the subscription manager after the web server receives the selection; and
   a communication server operable to send the operational profile to the application in response to an instruction, the subscription manager being configured to send the instruction to the communication server, the application being configured to store the operational profile received from the communication server on the eSIM card, the application being configured to activate the operational profile, the mobile cellular device being configured to communicate over a second network using the operational profile after the operational profile has been activated by the application.

2. The system of claim 1, wherein the first network is a different network from the second network.

3. The system of claim 2, wherein the first network operates in a first country and the second network operates in a different second country.

4. The system of claim 1, wherein the mobile cellular device is configured to communicate over the second network using the operational profile immediately after the operational profile has been activated by the application.

5. The system of claim 1, wherein the communication server sends the operational profile to the application as a Short Message Service ("SMS") message or a Hypertext Transfer Protocol ("HTTP") message.

6. The system of claim 1, wherein the web server is configured to send the selection to the subscription manager as an application programming interface ("API") request comprising an identifier of the eSIM card, at least a portion of the provisioning profile, and an identifier of the selection.

7. The system of claim 6, wherein the provisioning profile comprises a provisioning International Mobile Subscriber Identity ("IMSI"), and the API comprises the provisioning IMSI.

8. The system of claim 1, wherein the plurality of service plans are ranked on the web interface by at least one of cost, performance, and quality of service.

9. A method comprising:
receiving, by a Gateway GPRS Support Node ("GGSN"), a communication from a provisioning profile stored by an embedded subscriber identity module ("eSIM") card installed in a mobile cellular device;
identifying, by the GGSN, a rating group policy for the provisioning profile, the rating group policy indicating that the provisioning profile is to be redirected to a web portal on a web server;
sending, by the GGSN, a redirected communication to the web portal over a first network, the web portal generating a web interface;
receiving, by the web server, the redirected communication;
transmitting, by the web server, the web interface to a browser installed on the mobile cellular device, the web interface comprising information about a plurality of pre-activated service plans, the browser displaying the web interface to an end user;
receiving, by the web server, a selection of one of the plurality of pre-activated service plans from the browser;
sending, by the web server, a request to a subscription manager, the request comprising an identification of the selected pre-activated service plan;
selecting, by the subscription manager, an operational profile associated with the identification;
transmitting, by the subscription manager, an instruction to a communication server, the instruction instructing the communication server to transmit the operational profile to an application installed on the eSIM card; and
transmitting, by the communication server, the operational profile in accordance with the instruction, the application storing and activating the operational profile, the activated operational profile being configured to communicate over a second network, the second network being a different network from the first network.

10. The method of claim 9, wherein the web server is configured to send the selection to the subscription manager as an application programming interface ("API") request comprising an identifier of the eSIM card, at least a portion of the provisioning profile, and an identifier of the selection.

11. The method of claim 10, wherein the provisioning profile comprises a provisioning International Mobile Subscriber Identity ("IMSI"), and the API comprises the provisioning IMSI.

12. The method of claim 9, wherein the GGSN receives the rating group policy from at least one other computing device of the first network.

13. The method of claim 9, wherein the first network operates in a first country and the second network operates in a different second country.

14. The method of claim 9, wherein the mobile cellular device is configured to communicate over the second network using the operational profile immediately after the operational profile has been activated by the application.

15. The method of claim 9, wherein the communication server sends the operational profile to the application as an SMS message or a HTTP message.

16. The method of claim 9, wherein the plurality of pre-activated service plans are ranked on the web interface by at least one of cost, performance, and quality of service.

17. The method of claim 9, wherein the provisioning profile is operational to establish communication over only the first network.

18. A method comprising:
receiving, by a web portal on a web server, a redirected communication from a Gateway GPRS Support Node ("GGSN"), the GGSN having received a communication from a provisioning profile stored by an embedded subscriber identity module ("eSIM") card installed in a mobile cellular device, and, in response to the communication, the GGSN having obtained a rating group policy for the provisioning profile indicating that the provisioning profile is to be redirected to the web portal, and transmitted the redirected communication to the web portal over a first network, the web portal generating a web interface;
transmitting, by the web server, the web interface to a browser installed on the mobile cellular device, the web interface comprising information about a plurality of pre-activated service plans, the browser displaying the web interface to an end user;
receiving, by the web server, a selection of one of the plurality of pre-activated service plans from the browser;
sending, by the web server, a request to a subscription manager, the request comprising an identification of the selected pre-activated service plan;
selecting, by the subscription manager, an operational profile associated with the identification;
transmitting, by the subscription manager, an instruction to a communication server, the instruction instructing the communication server to transmit the operational profile to an application installed on the eSIM card; and
transmitting, by the communication server, the operational profile in accordance with the instruction, the application storing and activating the operational profile, the activated operational profile being configured to communicate over a second network, the second network being different from the first network.

19. The method of claim 18, wherein the web server is configured to send the selection to the subscription manager as an application programming interface ("API") request comprising an identifier of the eSIM card, at least a portion of the provisioning profile, and an identifier of the selection.

20. The method of claim 19, wherein the provisioning profile comprises a provisioning International Mobile Subscriber Identity ("IMSI"), and the API comprises the provisioning IMSI.

21. The method of claim 18, wherein the first network operates in a first country and the second network operates in a different second country.

22. The method of claim 18, wherein the mobile cellular device is configured to communicate over the second network using the operational profile immediately after the operational profile has been activated by the application.

23. The method of claim 18, wherein the provisioning profile is operational to establish communication over only the first network.

\* \* \* \* \*